United States Patent
Isoyama

(10) Patent No.: US 7,325,142 B2
(45) Date of Patent: Jan. 29, 2008

(54) IP NETWORK AND ADMISSION CONTROL METHOD USED THEREFOR

(75) Inventor: Kazuhiko Isoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 687 days.

(21) Appl. No.: 10/307,940

(22) Filed: Dec. 3, 2002

(65) Prior Publication Data

US 2003/0135600 A1    Jul. 17, 2003

(30) Foreign Application Priority Data

Dec. 5, 2001    (JP) .............................. 2001-370796

(51) Int. Cl.
*H04L 9/00* (2006.01)
*G06F 15/173* (2006.01)
*G06F 15/16* (2006.01)

(52) U.S. Cl. ...................... 713/184; 380/277; 705/52; 709/206; 709/223; 709/229; 713/159; 713/182; 726/3; 726/10; 726/30

(58) Field of Classification Search ..................... None
See application file for complete search history.

(56) References Cited

U.S. PATENT DOCUMENTS

| | | | | |
|---|---|---|---|---|
| 5,506,961 A | * | 4/1996 | Carlson et al. ................ 726/5 |
| 5,634,006 A | * | 5/1997 | Baugher et al. ............ 709/224 |
| 5,745,694 A | * | 4/1998 | Egawa et al. ............... 709/225 |
| 5,901,284 A | * | 5/1999 | Hamdy-Swink ............... 726/5 |
| 6,205,484 B1 | * | 3/2001 | Eriksson ..................... 709/226 |
| 6,615,264 B1 | * | 9/2003 | Stoltz et al. ................ 709/225 |
| 2002/0062289 A1 | * | 5/2002 | Kondo ........................ 705/52 |

* cited by examiner

Primary Examiner—Gilberto Barron, Jr.
Assistant Examiner—Laurel Lashley
(74) Attorney, Agent, or Firm—Young & Thompson

(57) ABSTRACT

The access network manager terminal 5 makes a communication quality agreement with the core network manager terminal 3, the core network manager terminal 3 conducts resource assignment of the core network 100 based on the communication agreement, notifies the access network manager terminal 5 of password information of the assigned resource and notifies the edge router 1*a* of password authentication information. The user terminal 4*a* communicates a password sent from the access network manager terminal 5 in response to a resource use permission request as being contained in a header of a packet and the edge router 1*a* authenticates the password of the packet based on the password authentication information.

22 Claims, 8 Drawing Sheets

IP NETWORK AND ADMISSION CONTROL METHOD USED THEREFOR

BACKGROUND OF THE INVENTION

1. Field of the Invention

The present invention relates to an IP (Internet Protocol) network and an admission control method used therefor and, more particularly, to a transfer method at an optimum service level in an IP network.

2. Description of the Related Art

In recent years, IP networks have enjoyed their rapid growth to become global communication infrastructure having commerciality. With the growth, the IP networks are expected to serve as service infrastructure not only for conventional data communication but also for every other kind of communication application including telephone.

This expectation creates the need of transferring application traffic required to have different characteristics and service levels, that is, QoS (Quality of Service), at an optimum service level.

Currently proposed techniques which provide such QoS include Diffserv [Differentiated Service, IETF (Internet Engineering Task Force) RFC (Request For Comments) 2475] and MPLS (Multi Protocol Label Switching IETF RFC3031, IETF RFC2702).

Operation of a service-level-agreement-based Diffserv will be described with reference to FIG. 8. A core network manager terminal 23 of a core router 22 makes a service level agreement 511 (called SLA) with a manager terminal 25 of an access network 600.

The service level agreement 511 includes communication quality such as a band for use by traffic from the access network 600 with respect to each quality class and a delay provided by a core network 500, and a kind of traffic (application, user information) to be communicated in the quality class in question.

Based on the service level agreement 511, the core network manager terminal 23 conducts buffer assignment of edge routers 21a and 21b and the core router 22 in the core network 500 for each class and resource assignment 512 such as transfer scheduling setting. For providing service only to traffic designated by the agreement, the core network manager terminal 23 conducts publishing setting 514 at the edge router 21a.

Based on the traffic kind information indicated in the service level agreement 511, the edge router 21a classifies the inflow packet 514 and applies a DSCP (Diffserv Code Point) to the same as a class identifier. Then, the core router 22 within the domain conducts queuing and transfer scheduling for each class based on the value of the DSCP.

This enables communication quality to be provided for each class so as to meet properties of an application. At this time, the admission of the edge router 21a monitors an inflow of traffic to discard traffic 515 whose volume exceeds a contracted volume of traffic or transfer the same similarly to common traffic without receiving contracted service [called BE (Best Effort)].

On the other hand, in an MPLS, a label of a fixed length is applied to a packet which will be transferred based on the value of the label. By implicitly controlling an LSP (Label Switched Path) as a path on which the packet is transferred, an optimum path 513 can be provided based on a requested QoS of traffic.

Commonly used as a charging method is a system in which the access network manager terminal 25 pays an agreement fee for the service level agreement 511 made with the core network manager terminal 23, while collecting monthly-fixed charges from user terminals 24a and 24b. Another system is recently provided of setting a charge for each quality class used by the user terminals 24a and 24b.

With the above-described conventional architecture, however, even using the same communication application, the user terminals 24a and 24b might not dare to have high quality communication at the cost of a heavy charge. It is therefore inappropriate to designate a certain application as a kind of traffic to uniformly assign a high-quality class to the traffic of the application and charge for the same.

In addition, since in many of communication applications used in the IP networks, the user terminals 24a and 24b autonomously start communication, the access network manager terminal 25 is not allowed to dynamically control to which user' application traffic assigned is contracted service. As a result, a volume of inflow traffic of each quality class to the core network 500 exceeds a contracted volume of traffic, so that contracted communication quality might not be guaranteed for the user terminal 24a.

Moreover, when making the service level agreement 511 with the core network manager terminal 23 by paying a fee, the access network manager terminal 25 is not allowed to charge the user terminal 24a according to the use of high-quality communication service in order to collect the fee.

Furthermore, in a case where there exist a plurality of entrance edge routers through which the access network 600 connects to the core network 500, even if resource assignment including path control is conducted from the entrance edge routers to an exit edge router by an MPLS or the like, appropriate resource assignment is not possible because it is impossible to predict through which entrance edge router the application traffic flows.

A further system is provided in which when communicating, a user terminal makes a request for ensuring communication quality and a network conducts setting for ensuring the communication quality in response to the request. Setting for ensuring communication quality, however, includes calculation of an optimum path and a necessary amount of buffer, setting of a calculated path and buffer assignment setting of all the routers on the path, and accordingly costs time for setting.

Thus, if every time the user terminal conducts communication, it makes a request for ensuring communication quality and then the network conducts setting for ensuring the communication quality, it takes time before setting is completed to delay communication start at the user terminal.

SUMMARY OF THE INVENTION

An object of the present invention is accordingly to provide an IP network which eliminates the above-described problems, ensures contracted communication quality without consuming time in setting for ensuring communication quality and enables charging according to the use of high-quality communication services, and an admission control method for use therefor.

According to one aspect of the invention, an IP network which maintains communication quality at the time when a user terminal conducts communication through a core network based on a communication quality service level agreement made between an access network manager terminal for managing an access network to which the user terminal is connected and a core network manager terminal for managing the core network including an edge router and a core router, wherein the core network manager terminal includes means for notifying the access network manager terminal of password information for generating a password for the reception of service based on the communication quality service level agreement.

In the preferred construction, the access network manager terminal includes means for generating a password based on the password information and transmitting the same when receiving from the user terminal a service request indicative of the intention of conducting communication having the contracted communication quality, and the user terminal includes means for conducting communication with the password contained in a packet header.

In another preferred construction, the user terminal conducts communication with a communication period contained in the password in which period communication is possible having the contracted communication quality.

In another preferred construction, the edge router includes means for authenticating rightfulness of the password contained in the packet header, and means for providing service of the contracted communication quality when determination is made by the authentication that the password is right.

In another preferred construction, the access network manager terminal makes a charge based on a requested communication quality class, a communication period and a communication rate contained in a service request from the user terminal.

In another preferred construction, the access network manager terminal includes means for generating a password based on the password information and transmitting the same when receiving from the user terminal a service request indicative of the intention of conducting communication having the contracted communication quality, the user terminal includes means for conducting communication with the password contained in a packet header, and the access network manager terminal makes a charge based on a requested communication quality class, a communication period and a communication rate contained in the service request from the user terminal.

In another preferred construction, the password information includes ciphering key information for ciphering a password, the core network manager terminal notifies the edge router of cipher decoding key information for decoding a password, the access network manager terminal ciphers the password to be notified to the user terminal, and the edge router decodes the password contained in the packet header to conduct authentication.

In another preferred construction, the access network manager terminal includes means for generating a password based on the password information and transmitting the same when receiving from the user terminal a service request indicative of the intention of conducting communication having the contracted communication quality, the user terminal includes means for conducting communication with the password contained in a packet header, the password information includes ciphering key information for ciphering a password, the core network manager terminal notifies the edge router of cipher decoding key information for decoding a password, the access network manager terminal ciphers the password to be notified to the user terminal, and the edge router decodes the password contained in the packet header to conduct authentication.

In another preferred construction, the user terminal notifies the access network manager terminal of flow identification information at the time of making the service request, the access network manager terminal notifies the password with the flow identification information contained, and the edge router provides service without password authentication of a packet coincident with the flow identification information during a period of validity of the password.

In another preferred construction, the access network manager terminal includes means for generating a password based on the password information and transmitting the same when receiving from the user terminal a service request indicative of the intention of conducting communication having the contracted communication quality, the user terminal includes means for conducting communication with the password contained in a packet header, the user terminal notifies the access network manager terminal of flow identification information at the time of making the service request, the access network manager terminal notifies the password with the flow identification information contained, and the edge router provides service without password authentication of a packet coincident with the flow identification information during a period of validity of the password.

In another preferred construction, the user terminal notifies the access network manager terminal of flow identification information at the time of making the service request, the access network manager terminal notifies the password with the flow identification information and the communication rate contained, and the edge router publishes a packet coincident with the flow identification information at the communication rate. rate.

In another preferred construction, the access network manager terminal includes means for generating a password based on the password information and transmitting the same when receiving from the user terminal a service request indicative of the intention of conducting communication having the contracted communication quality, the user terminal includes means for conducting communication with the password contained in a packet header, the user terminal notifies the access network manager terminal of flow identification information at the time of making the service request, the access network manager terminal notifies the password with the flow identification information and the communication rate contained, and the edge router publishes a packet coincident with the flow identification information at the communication rate.

In another preferred construction, the user terminal notifies the access network manager terminal of a communication period at the time of making the service request, and the access network manager terminal determines whether there is a free resource during the communication period based on resource reservation conditions.

In another preferred construction, the access network manager terminal includes means for generating a password based on the password information and transmitting the same when receiving from the user terminal a service request indicative of the intention of conducting communication having the contracted communication quality, the user terminal includes means for conducting communication with the password contained in a packet header, the user terminal notifies the access network manager terminal of a communication period at the time of making the service request, and the access network manager terminal determines whether there is a free resource during the communication period based on resource reservation conditions.

In another preferred construction, at the time of notifying the user terminal of the password, the access network manager terminal notifies through which edge router a packet of a session which receives service should pass.

Also, the access network manager terminal includes means for generating a password based on the password information and transmitting the same when receiving from the user terminal a service request indicative of the intention of conducting communication having the contracted communication quality, the user terminal includes means for conducting communication with the password contained in a packet header, and at the time of notifying the user terminal of the password, the access network manager terminal notifies through which edge router a packet of a session which receives service should pass.

According to another aspect of the invention, an admission control method of an IP network which maintains communication quality at the time when a user terminal conducts communication through a core network based on a communication quality service level agreement made between an access network manager terminal for managing an access network to which the user terminal is connected and a core network manger terminal for managing the core network including an edge router and a core router, wherein the core network manager terminal includes the step of notifying the access network manager terminal of password information for generating a password for the reception of service based on the communication quality service level agreement.

In the preferred construction, the access network manager terminal includes the step of generating a password based on the password information and transmitting the same when receiving from the user terminal a service request indicative of the intention of conducting communication having the contracted communication quality, and the user terminal includes the step of conducting communication with the password contained in a packet header.

In another preferred construction, communication is conducted with a communication period contained in the password from the user terminal to the edge router in which period communication is possible having the contracted communication quality.

In another preferred construction, the edge router includes the steps of authenticating rightfulness of the password contained in the packet header, and providing service of the contracted communication quality when determination is made by the authentication that the password is right.

In another preferred construction, the access network manager terminal makes a charge based on a requested communication quality class, a communication period and a communication rate contained in a service request from the user terminal.

In another preferred construction, the password information includes ciphering key information for ciphering a password, the core network manager terminal notifies the edge router of cipher decoding key information for decoding a password, the access network manager terminal ciphers the password to be notified to the user terminal, and the edge router decodes the password contained in the packet header to conduct authentication.

In another preferred construction, flow identification information is notified to the access network manager terminal at the time of the service request made by the user terminal, the password from the access network manager terminal to the user terminal is notified with the flow identification information contained, and service is provided by the edge router without password authentication of a packet coincident with the flow identification information during a period of validity of the password.

In another preferred construction, flow identification information is notified to the access network manager terminal at the time of the service request made by the user terminal, the password from the access network manager terminal to the user terminal is notified with the flow identification information and the communication rate contained, and the edge router publishes a packet coincident with the flow identification information at the communication rate.

In another preferred construction, a communication period is notified to the access network manager terminal at the time of the service request made by the user terminal, and the access network manager terminal determines whether there is a free resource during the communication period based on resource reservation conditions.

Also, at the time of notifying the user terminal of the password by the access network manager terminal, through which edge router a packet of a session which receives service should pass is notified.

In other words, when an access network manager terminal which provides a user terminal with network access makes a communication quality agreement with a core network manager terminal, an IP network of the present invention applies password information necessary for generating a password for receiving service of the communication quality in question from the core network manager terminal.

When the user terminal as a member of the access network communicates using the core network, if the terminal wants to receive service of the communication quality in question, it makes a service request to the access network manager terminal and obtains a password for receiving the service of the communication quality from the access network manager terminal. The user terminal conducts communication with the password buried in a packet header of a session to be communicated with the contracted communication quality and an edge router of the core network identifies a packet having the right password to provide the contracted communication quality only to the relevant packet, thereby enabling the contracted communication quality to be supplied to the session desired by the user terminal.

As a result, only the session desired by the user terminal is allowed to use the contracted communication quality service and unlike a system of uniformly determining communication quality by a communication application or a user terminal, communication quality can be selected for each session by user's intention. At that time, since required is only the confirmation of the password but not setting for ensuring communication quality, the need of consuming time required for setting for the purpose of ensuring communication quality is eliminated.

In addition, the access network manager terminal is allowed to manage a session of the user terminal which receives, from the core network with which a communication quality agreement is made, service of the contracted communication quality to enable charging the user terminal according to the service provided.

As a result, it is possible to collect a contracted fee to be paid by the access network manager terminal to the core network manager terminal when making a communication quality agreement from the user terminal using service of the contracted communication quality.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
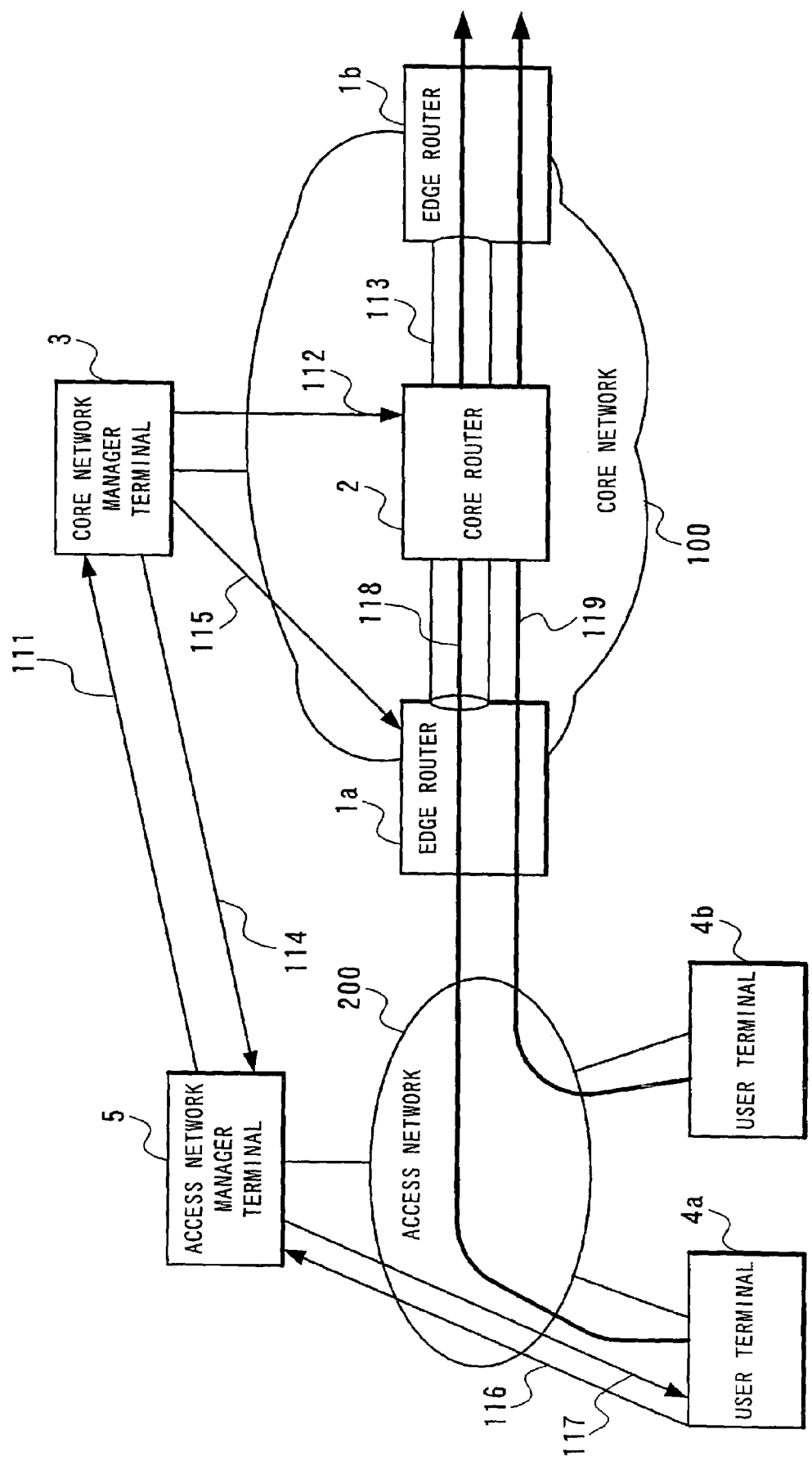
FIG. 1 is a block diagram showing a structure of an IP (Internet Protocol) network according a first embodiment of the present invention.

FIG. 1 is a block diagram showing a structure of an IP (Internet Protocol) network according to a first embodiment of the present invention. In FIG. 1, the IP network according to the first embodiment of the present invention includes a core network 100 managed by a core network manager terminal 3 and an access network 200 managed by an access network manager terminal 5.

The core network 100 is composed of edge routers 1a and 1b and a core router 2 and to the access network 200, user terminals 4a and 4b are connected. The access network 200 is also connected to the core network 100 through the edge router 1a.

Figure 2:
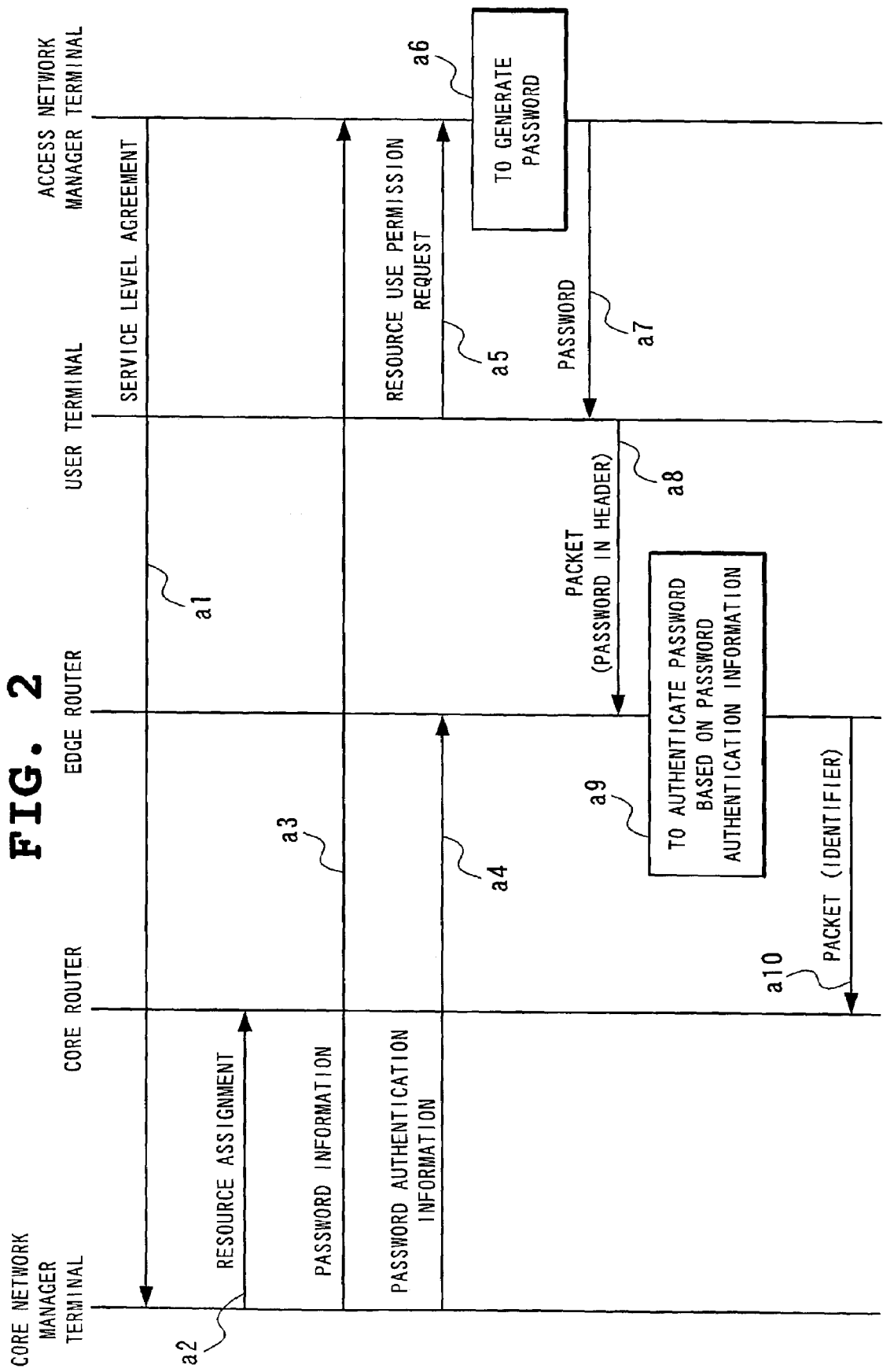
FIG. 2 is a sequence chart showing operation of the IP network according to the first embodiment of the present invention.

FIG. 2 is a sequence chart showing operation of the IP network according to the first embodiment of the present invention. With reference to FIGS. 1 and 2, operation of the IP network according to the first embodiment of the present invention will be described.

The access network manager terminal 5 makes a communication quality agreement 111 with the core network manager terminal 3 (see a1 in FIG. 2). The communication quality agreement 111 is a contract defining, for each quality class, communication quality which can be obtained when the user terminals 4a and 4b connected to the access network 200 communicate through the core network 100, in which agreement, a delay, delay fluctuation, a packet discard rate and the like are defined for each quality class. The communication quality agreement 111 also defines the entrance edge router 1a and the exit edge router 1b for traffic from the access network 200 from which the communication quality in question is obtained, its maximum transmission rate, and the like.

The core network manager terminal 3 conducts resource assignment 112 of the core network 100 so as to guarantee contracted communication quality based on the communication quality agreement 111 (see a2 of FIG. 2). The resource assignment 112 includes band assignment on a path from the entrance edge router 1a to the exit edge router 1b. buffer assignment on the edge routers 1a and 1b and the core router 2, and the like.

As a result, a resource 113 is assigned to the edge routers 1a and 1b and the core router 2 of the core network 100 in FIG. 1. The core network manager terminal 3 also conducts rate monitoring setting at the edge router 1a to prevent traffic from the access network 200 whose rate exceeds a contracted rate from using the assigned resource 113.

The core network manager terminal 3 notifies the access network manager terminal 5 of password information 114 for the use of the assigned resource 113 (see a3 in FIG. 2). The password information 114 is information necessary for generating a password 117 for the communication of traffic of a specific rate for a specific period by using the assigned resource.

The core network manager terminal 3 notifies the edge router 1a of password authentication information 115 for authenticating the password 117 generated by the password information 114 (see a4 in FIG. 2).

The user terminal 4a which desires to communicate with the contracted communication quality notifies the access network manager terminal 5 of a resource use permission request 116 (see a5 in FIG. 2). The resource use permission request 116 contains such traffic information as a communication quality class, a communication rate and a destination address.

When determining that a destination address indicated in the resource use permission request 116 is an address reachable by using the resource 113 and that the resource 113 has a free space (that a total rate of entire flow allowed to use the resource is not more than the contracted rate), the access network manager terminal 5 generates the password 117 permitting the use of the resource (see a6 in FIG. 2). The password 117 has its period of validity fixed. The access network manager terminal 5 notifies the user terminal 4a of the password 117 (see a7 in FIG. 2).

The user terminal 4a conducts communication with the password 117 received from the access network manager terminal 5 contained in the header of a packet 118 to be communicated with the contracted communication quality (see a8 in FIG. 2).

Upon receiving the packet 118, the edge router 1a authenticates the password 117 contained in the header of the packet 118 based on the password authentication information 115 (see a9 in FIG. 2). When determining that the password 117 is valid, the edge router 1a conducts setting to transfer the packet 118 with an identifier (DSCP value in a case of Diffserv and LABEL in a case of MPLS) attached thereto such that the packet 118 can be transmitted using the resource 113 (see a10 in FIG. 2).

As a result, the packet 118 of the user terminal 4a is transferred using the resource 113 to realize communication of the contracted communication quality.

When at the authentication of the password 117 by the edge router 1a, determination is made that the password 117 is not valid, the edge router 1a handles the packet 118 in the same manner as a general packet and transfers the packet to have general quality without using the resource 113 (best effort transfer).

When the user terminal 4a wants to continue communication of the contracted communication quality after the expiration of the password 117, the terminal again notifies the access network manager terminal 5 of the resource use permission request 116 before the password 117 expires and obtains the password 117 valid for an additional communication period to continue the communication. Hereinafter, the above-described processing will be repeated until the end of the communication.

Based on the information (communication period, rate) indicated in the resource use permission request 116, the access network manager terminal 5 charges the user terminal 4a for the use of the resource 113.

On the other hand, the user 4b which wants to conduct communication without using the resource 113 (general quality) communicates a packet 119 with no password contained without making a resource use permission request to the access network manager terminal 5.

Since no password is contained in the packet 119, the edge router 1a handles the packet 119 as a general packet and transfers the same to have general quality without using the resource 113 (best effort transfer).

Thus, the access network manager terminal 5 generates the password 117 based on the password information 114 for the generation of a password which is given by the core network manager terminal 3 and distributes the generated password to the user terminal 4a which desires high-quality communication, while the core network 100 provides services based on the password 117, whereby service of the contracted communication quality can be provided only to a session that the user terminal 4a wants.

At this time, since the edge router 1a conducts only the confirmation of the password 117 and therefore needs not make setting for ensuring communication quality, no time will be consumed for the setting for ensuring communication quality.

As a result, only a desired session of the user terminal 4a is allowed to use service of the contracted communication quality and unlike a system of uniformly determining communication quality by a communication application or a user, communication quality can be selected for each session by user's intention.

With the same application, when a different charge is set for each quality class, for example, a user who wants communication of high quality even by paying a heavy charge is allowed to select a high-quality class and a user who does not want high-quality communication at the cost of a heavy charge is allowed to select communication of general quality.

Moreover, management of the password 117 and distribution of the same to the user 4a desiring the password by the access network manager terminal 5 enables the access network manager terminal 5 to manage a session of the user terminal 4a which receives, in the core network 100 with which the communication quality agreement is made, service of the contracted communication quality and to charge the user terminal 4a according to the service provided.

As a result, a contract fee to be paid by the access network manager terminal 5 to the core network manager terminal 3 when making the communication quality agreement 111 can be collected from the user terminal 4a using the service of the contracted communication quality.

Figure 3:
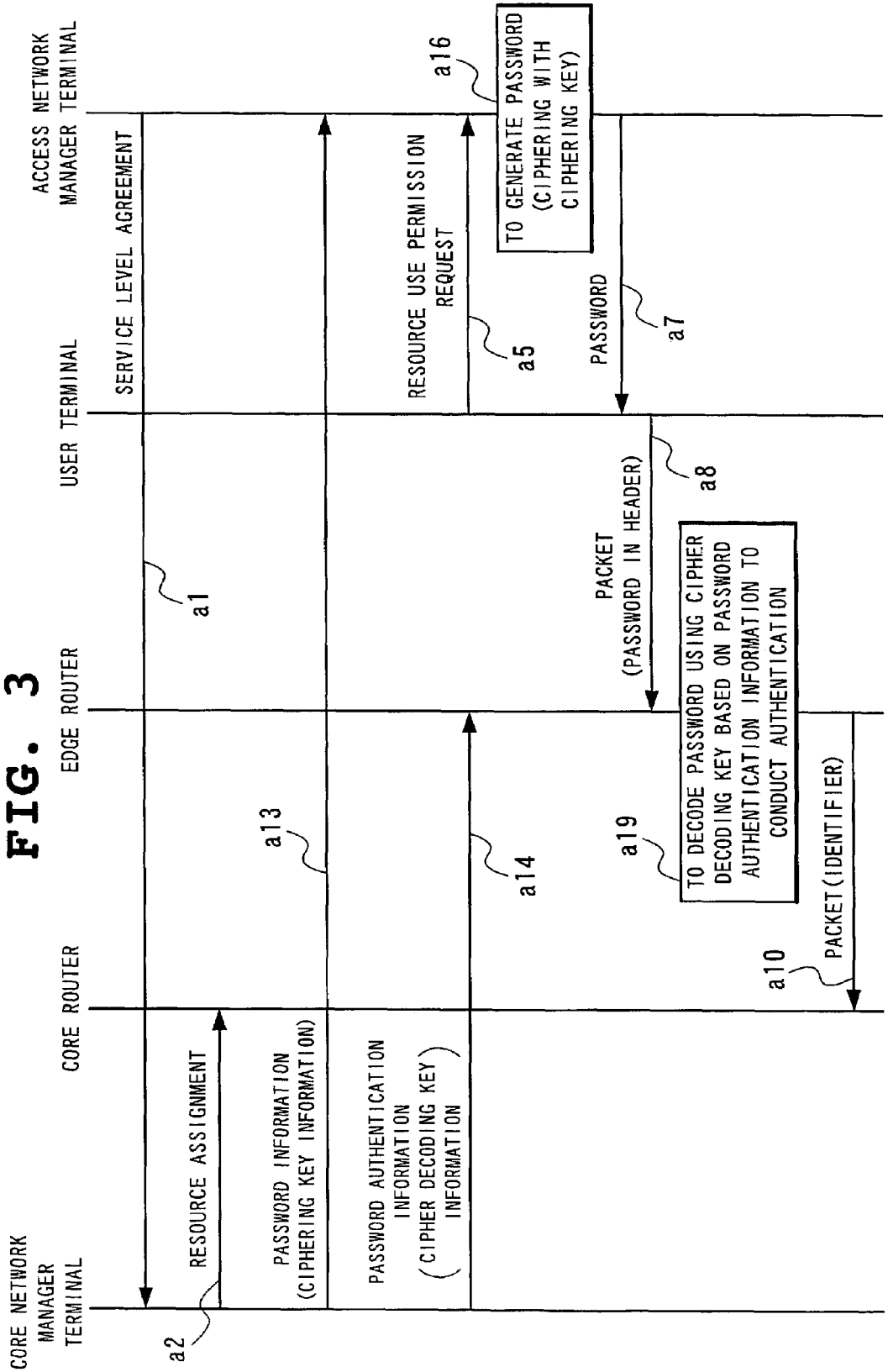
FIG. 3 is a sequence chart showing operation of an IP network according to a second embodiment of the present invention.

FIG. 3 is a sequence chart showing operation of an IP network according to a second embodiment of the present invention. Since the IP network according to the second embodiment of the present invention has the same structure as that of the IP network according to the first embodiment of the present invention which is shown in FIG. 1, operation of the IP network according to the second embodiment of the present invention will be described with reference to FIGS. 1 and 3.

The second embodiment of the present invention is designed such that in the above-described operation of the first embodiment of the present invention, the password information 114 includes ciphering key information for ciphering the password 117 (see a13 in FIG. 3) and the password authentication information 115 includes cipher decoding key information for decoding the password 117 ciphered (see a14 in FIG. 3).

At the generation of the password 117, the access network manager terminal 5 ciphers the password 117 by using a ciphering key (see a16 in FIG. 3) and at the authentication of the password 117, the edge router 1a conducts authentication after decoding the password by using a cipher decoding key (see a19 in FIG. 3).

This prevents generation of a false password which is realized by estimating a method of defining a period of validity and a valid communication rate from the contents of the password 117 obtained before by the user terminal 4a.

Figure 4:
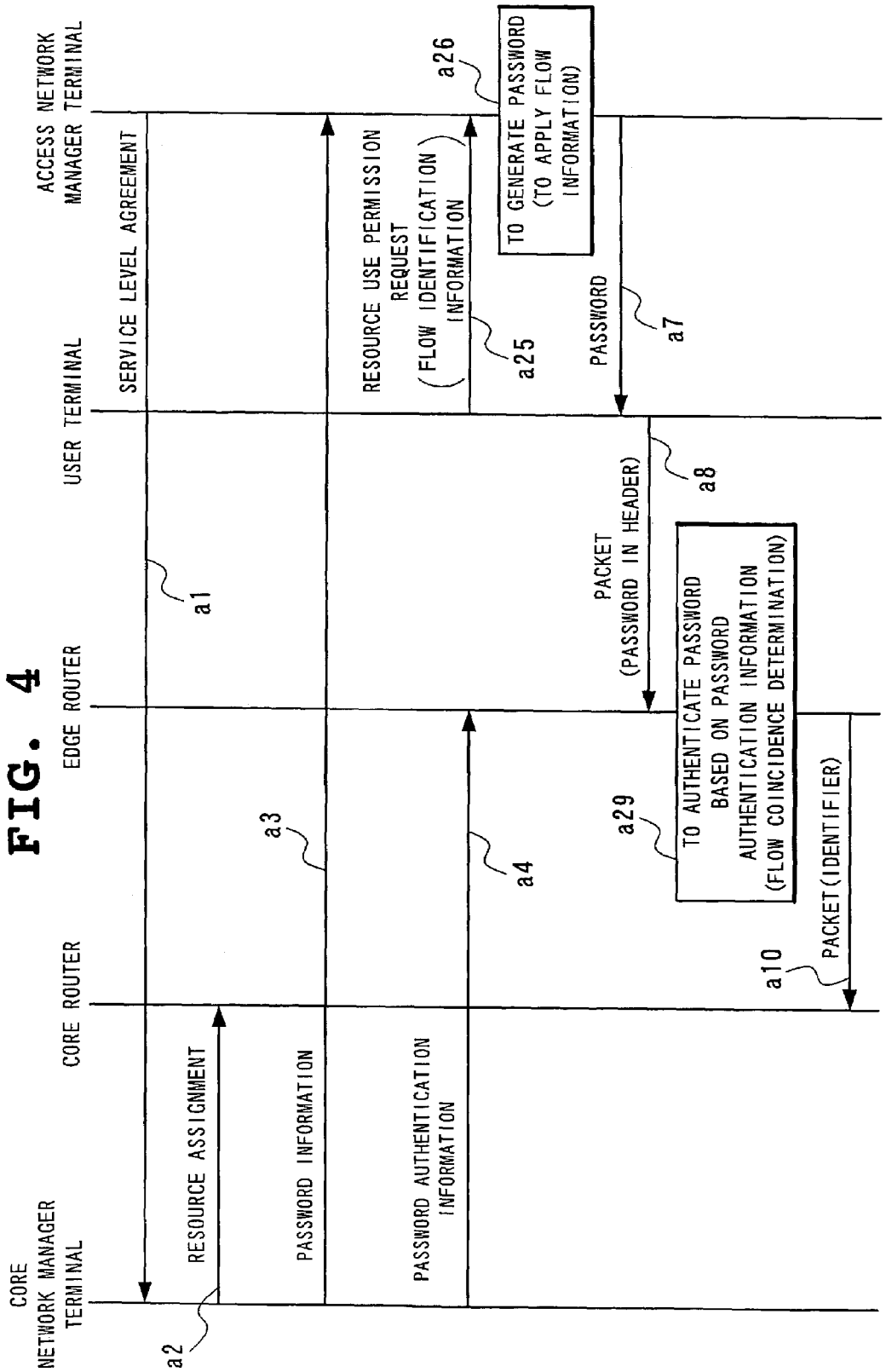
FIG. 4 is a sequence chart showing operation of an IP network according to a third embodiment of the present invention.

FIG. 4 is a sequence chart showing operation of an IP network according to a third embodiment of the present invention. Since the IP network according to the third embodiment of the present invention has the same structure as that of the IP network according to the first embodiment of the present invention which is shown in FIG. 1, operation of the IP network according to the third embodiment of the present invention will be described with reference to FIGS. 1 and 4.

The third embodiment of the present invention is designed such that in the above-described operation of the first embodiment of the present invention, when notifying the access network manager terminal 5 of the resource use permission request 116, the user terminal 4a also notifies flow identification information (destination address, transmission source address, layer 4 port number, etc.) of a session to be communicated with contracted communication quality (see a25 in FIG. 4) and when generating the password 117, the access network manager terminal 5 generates the password 117 so as to include flow information (see a26 in FIG. 4).

Upon determining that the password 117 is valid, the edge router 1a provides the service of the contracted communication quality to a flow coincident with the flow information contained in the password 117 without conducting password authentication within a period of validity of the password (see a29 in FIG. 4).

This eliminates the need of password authentication for each packet and in such a case where a password is ciphered and calculation for decoding the ciphered password is required, mitigates a burden of the calculation.

Figure 5:
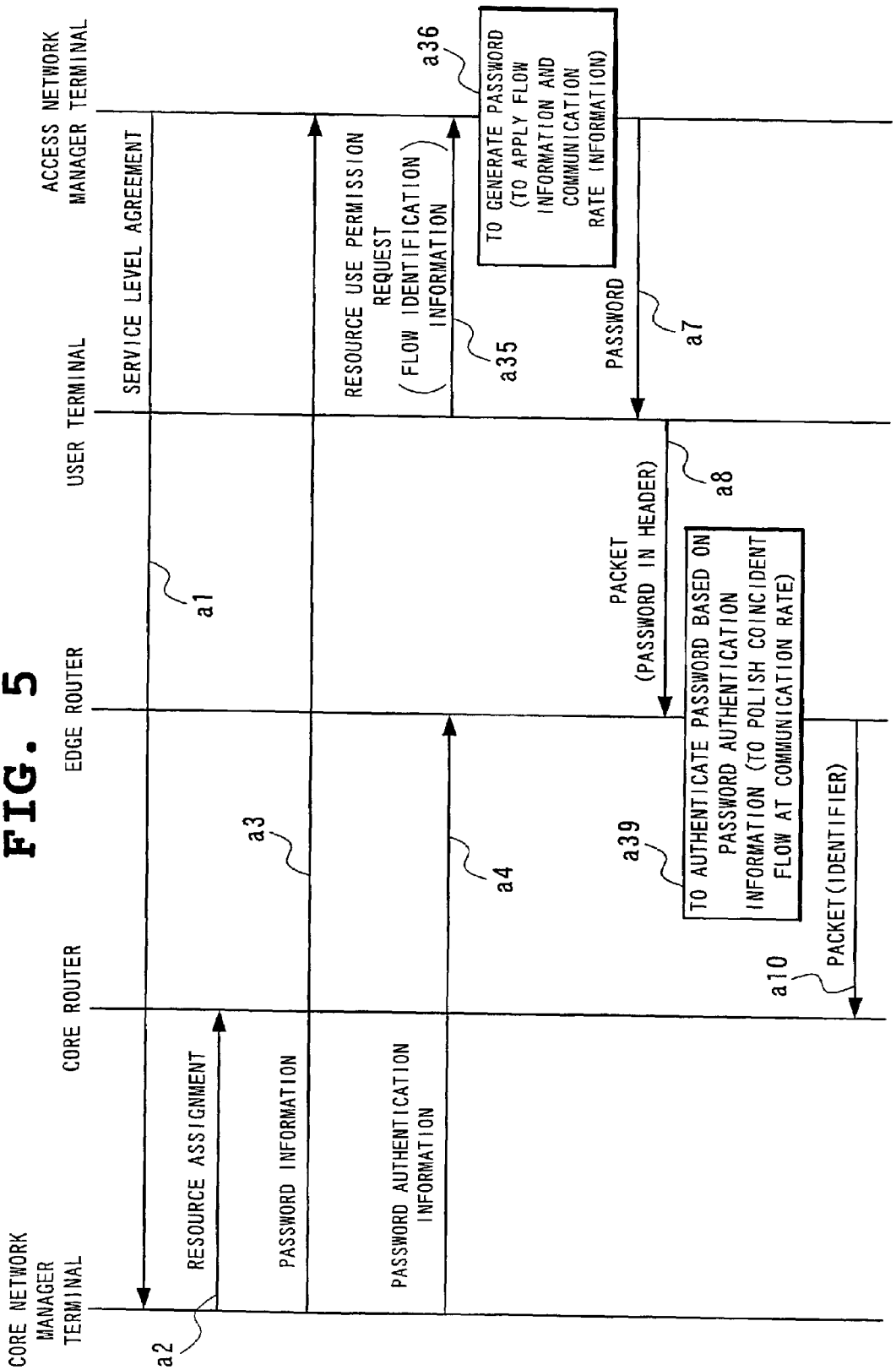
FIG. 5 is a sequence chart showing operation of an IP network according to a fourth embodiment of the present invention.

FIG. 5 is a sequence chart showing operation of an IP network according to a fourth embodiment of the present invention. Since the IP network according to the fourth embodiment of the present invention has the same structure as that of the IP network according to the first embodiment of the present invention which is shown in FIG. 1, operation of the IP network according to the fourth embodiment of the present invention will be described with reference to FIGS. 1 and 5.

The fourth embodiment of the present invention is designed such that in the above-described operation of the first embodiment of the present invention, when notifying the access network manager terminal 5 of the resource use permission request 116, the user terminal 4a also notifies flow identification information (destination address, transmission source address, layer 4 port number, etc.) of a session to be communicated with contracted communication quality (see a35 in FIG. 5) and when generating the password 117, the access network manager terminal 5 generates the password 117 so as to include flow information and information about a communication rate (see a36 in FIG. 5).

The edge router 1a is designed to publish a flow coincident with the flow information at the communication rate before transferring the packet 118 by using the resource 113 (see a39 in FIG. 5).

This prevents unlawfulness of applying the password 117 to a packet of a session whose rate exceeds the communication rate which is notified in the resource use permission request 116 to the access network manager terminal 5 by the user terminal 4a and receiving contracted communication quality.

Figure 6:
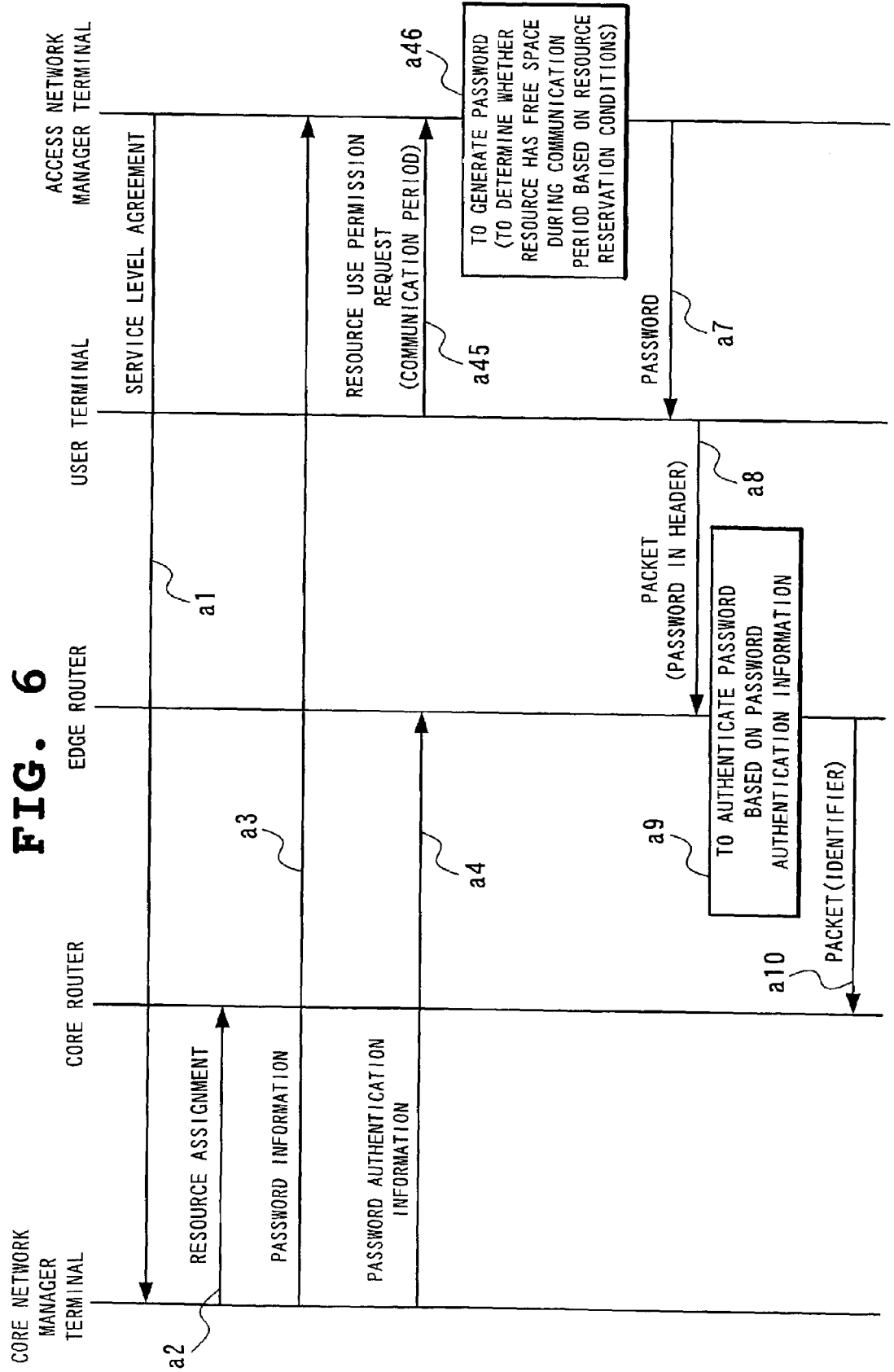
FIG. 6 is a sequence chart showing operation of an IP network according to a fifth embodiment of the present invention.

FIG. 6 is a sequence chart showing operation of an IP network according to a fifth embodiment of the present invention. Since the IP network according to the fifth embodiment of the present invention has the same structure as that of the IP network according to the first embodiment of the present invention which is shown in FIG. 1, operation of the IP network according to the fifth embodiment of the present invention will be described with reference to FIGS. 1 and 6.

According to the fifth embodiment of the present invention, in the above-described operation of the first embodiment of the present invention, when notifying the access network manager terminal 5 of the resource use permission request 116, the user terminal 4a also notifies a communication period (from when to when) (see a45 in FIG. 6), and when managing a future reservation of the resource 113 to make determination of a state of vacancy of the resource 113, the access network manager terminal 5 determines whether there is a free space in the resource 113 during the communication period based on resource reservation conditions (see a46 in FIG. 6).

Figure 7:
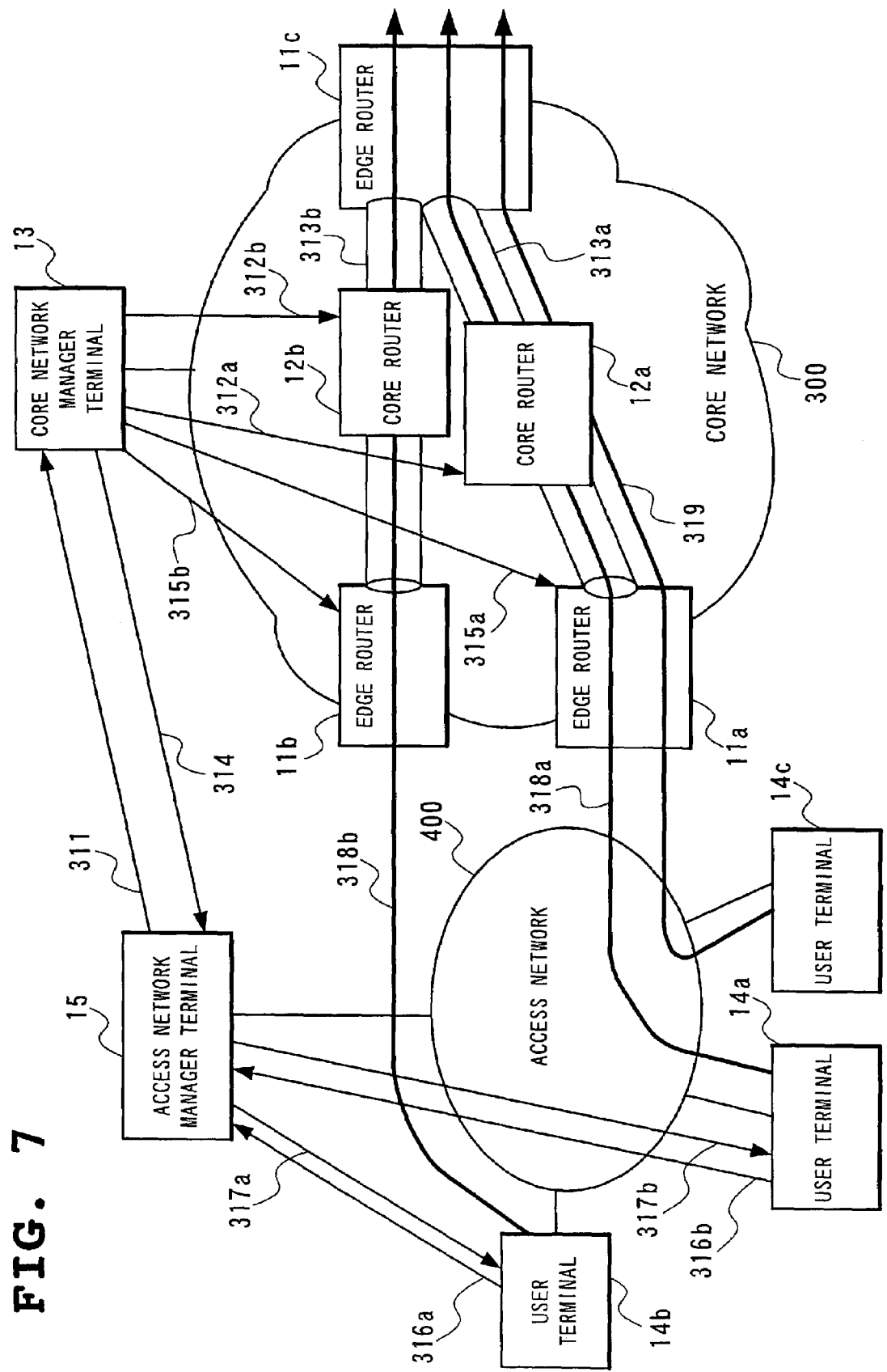
FIG. 7 is a block diagram showing a structure of an IP network according to a sixth embodiment of the present invention.
Figure 8:
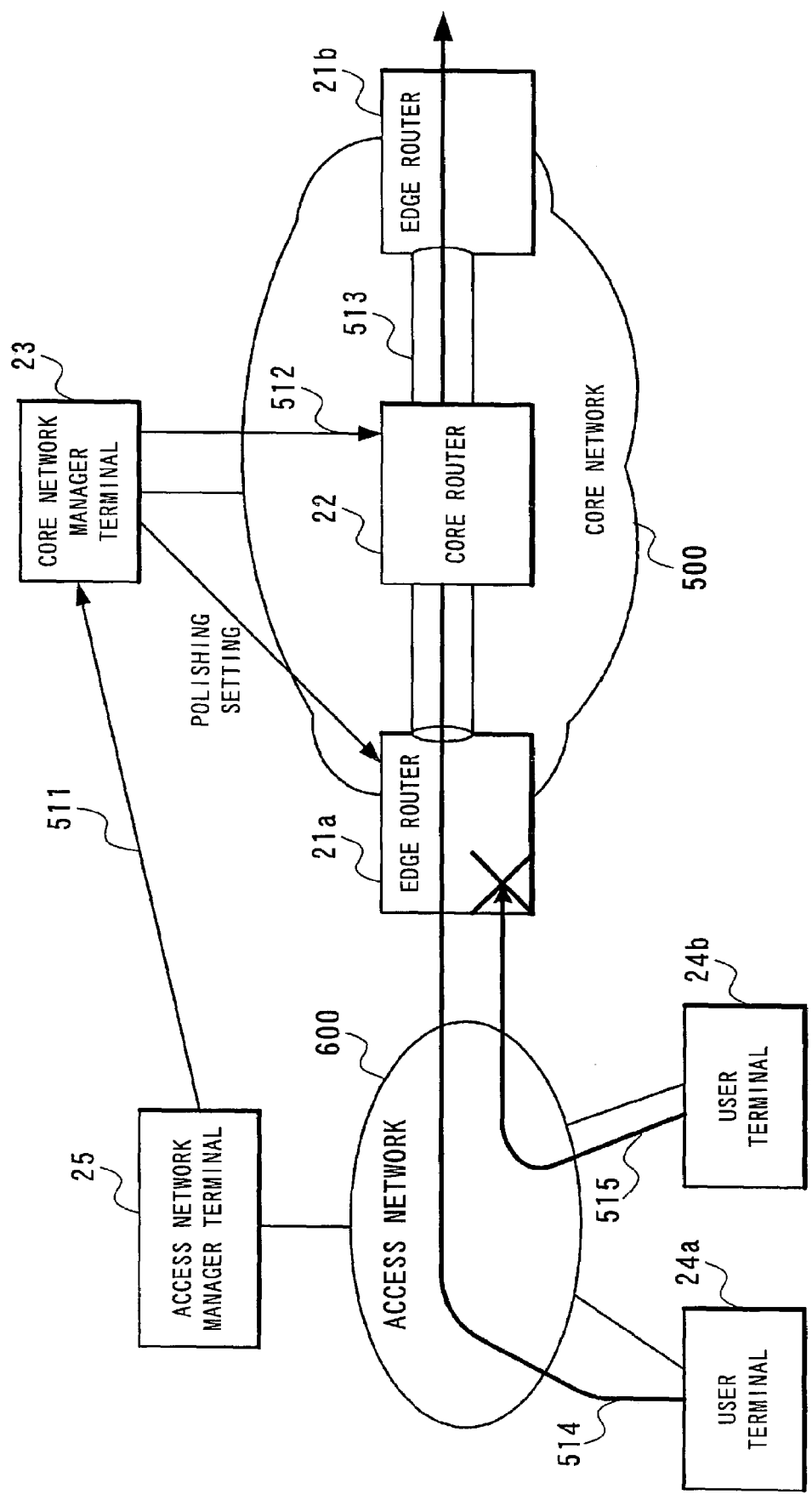
FIG. 8 is a block diagram showing a structure of a conventional IP network.

FIG. 7 is a block diagram showing a structure of an IP network according to a sixth embodiment of the present invention. In FIG. 7, in the IP network according to the sixth embodiment of the present invention, an access network 400 and a core network 300 are connected to each other through a plurality of edge routers 11a and 11b. In this case, based on a service level agreement 311, resources 313a and 313b are assigned between the edge routers 11a and 11b and an exit edge router 11c, respectively.

However, since it is unknown through which of the edge routers, packets 318a and 318b of user terminals 14a and 14b desiring high-quality communication flow into the core network 300, the assigned resources 313a and 313b might not be efficiently used due to concentration of traffic on one edge router or the like.

In the sixth embodiment of the present invention, therefore, when notifying the user terminals 14a and 14b which desire high-quality communication of passwords 317a and 317b, an access network manager terminal 15 also notifies through which of the edge routers 11a and 1b the packets 318a and 318b should flow into the core network 300 (path information).

When sending the packets 318a and 318b, the user terminals 14a and 14b send the packets with notified path information as source route information contained in the header, so that the terminals can use the assigned resources 313a and 313b as desired by the access network manager terminal 15.

As described in the foregoing, in an IP network which maintains communication quality at the time when a user terminal conducts communication through a core network based on a communication quality service level agreement made between an access network manager terminal for managing an access network to which the user terminal is connected and a core network manger terminal for managing the core network including an edge router and a core router, by notifying password information for generating a password necessary for receiving service based on the communication quality service level agreement to the access network manager terminal by the core network manager terminal, the present invention attains the effect of enabling contracted communication quality to be guaranteed without costing time for setting for the purpose of ensuring communication quality and enabling charging according to the use of high-quality communication service.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. An IP network which maintains contracted communication quality at the time when a user terminal conducts communication through a core network based on a communication quality service level agreement made between an access network manager terminal for managing an access network to which said user terminal is connected and a core network manager terminal for managing said core network including an edge router and a core router, wherein
    said core network manager terminal includes means for notifying said access network manager terminal of password information for generating a password for the reception of service based on said communication quality service level agreement,
    at the time of the user terminal making said service request, said user terminal notifies said access network manager terminal of a communication period for said service request,
    said access network manager terminal determines whether there is a free resource during said communication period based on resource reservation conditions,
    said access network manager terminal includes means for
        i) generating a password based on said password information received from said core network manager and
        ii) transmitting the generated password to said user terminal when receiving from said user terminal a service request indicative of the intention of conducting communication having the contracted communication quality, and
    said user terminal includes means for conducting communication with said edge router by transmitting a packet to said edge router with said password contained in a packet header of said packet.

2. The IP network as set forth in claim 1, wherein
    said user terminal conducts communication with a communication period contained in said password in which period communication is possible having said contracted communication quality.

3. The IP network as set forth in claim 1, wherein
said edge router includes:
means for authenticating rightfulness of the password contained in said packet header, and
means for providing service of said contracted communication quality when determination is made by the authentication that the password is right.

4. The IP network as set forth in claim 1, wherein
said access network manager terminal makes a charge based on a requested communication quality class, a communication period and a communication rate contained in a service request from said user terminal.

5. The IP network as set forth in claim 1, wherein
said access network manager terminal includes means for generating a password based on said password information and transmitting the same when receiving from said user terminal a service request indicative of the intention of conducting communication having the contracted communication quality,
said user terminal includes means for conducting communication with said password contained in a packet header, and
said access network manager terminal makes a charge based on a requested communication quality class, a communication period and a communication rate contained in the service request from said user terminal.

6. The IP network as set forth in claim 1, wherein
said password information includes ciphering key information for ciphering a password,
said core network manager terminal notifies said edge router of cipher decoding key information for decoding a password,
said access network manager terminal ciphers said password to be notified to said user terminal, and
said edge router decodes said password contained in said packet header to conduct authentication.

7. The IP network as set forth in claim 1, wherein
said access network manager terminal includes means for generating a password based on said password information and transmitting the same when receiving from said user terminal a service request indicative of the intention of conducting communication having the contracted communication quality,
said user terminal includes means for conducting communication with said password contained in a packet header,
said password information includes ciphering key information for ciphering a password,
said core network manager terminal notifies said edge router of cipher decoding key information for decoding a password,
said access network manager terminal ciphers said password to be notified to said user terminal, and
said edge router decodes said password contained in said packet header to conduct authentication.

8. The IP network as set forth in claim 1, wherein
said user terminal notifies said access network manager terminal of flow identification information at the time of making said service request,
said access network manager terminal notifies said password with said flow identification information contained, and
said edge router provides service without password authentication of a packet coincident with said flow identification information during a period of validity of said password.

9. The IP network as set forth in claim 1, wherein
said access network manager terminal includes means for generating a password based on said password information and transmitting the same when receiving from said user terminal a service request indicative of the intention of conducting communication having the contracted communication quality,
said user terminal includes means for conducting communication with said password contained in a packet header,
said user terminal notifies said access network manager terminal of flow identification information at the time of making said service request,
said access network manager terminal notifies said password with said flow identification information contained, and
said edge router provides service without password authentication of a packet coincident with said flow identification information during a period of validity of said password.

10. The IP network as set forth in claim 1, wherein
said user terminal notifies said access network manager terminal of flow identification information at the time of making said service request,
after receiving said service request, said access network manager terminal notifies said password with said flow identification information and said communication rate contained therein to the user terminal, and
said edge router publishes a packet coincident with said flow identification information at said communication rate.

11. The IP network as set forth in claim 1, wherein
said access network manager terminal includes means for generating a password based on said password information and transmitting the same when receiving from said user terminal a service request indicative of the intention of conducting communication having the contracted communication quality,
said user terminal includes means for conducting communication with said password contained in a packet header,
said user terminal notifies said access network manager terminal of flow identification information at the time of making said service request,
said access network manager terminal notifies said password with said flow identification information and said communication rate contained, and
said edge router publishes a packet coincident with said flow identification information at said communication rate.

12. The IP network as set forth in claim 1, wherein
said access network manager terminal includes means for generating a password based on said password information and transmitting the same when receiving from said user terminal a service request indicative of the intention of conducting communication having the contracted communication quality,
said user terminal includes means for conducting communication with said password contained in a packet header,
said user terminal notifies said access network manager terminal of a communication period at the time of making said service request, and said access network manager terminal determines whether there is a free resource during said communication period based on resource reservation conditions.

13. The IP network as set forth in claim 1, wherein
at the time of notifying said user terminal of said password, said access network manager terminal notifies through which edge router a packet of a session which receives service should pass.

14. The IP network as set forth in claim 1, wherein
said access network manager terminal includes means for generating a password based on said password information and transmitting the same when receiving from said user terminal a service request indicative of the intention of conducting communication having the contracted communication quality,
said user terminal includes means for conducting communication with said password contained in a packet header, and
at the time of notifying said user terminal of said password, said access network manager terminal notifies through which edge router a packet of a session which receives service should pass.

15. An admission control method of an IP network which maintains contracted communication quality at the time when a user terminal conducts communication through a core network based on a communication quality service level agreement made between an access network manager terminal for managing an access network to which said user terminal is connected and a core network manager terminal for managing said core network including an edge router and a core router, wherein,
said core network manager terminal includes a step of notifying said access network manager terminal of password information for generating a password for the reception of service based on said communication quality service level agreement,
said access network manager terminal includes the step of generating a password based on said password information and transmitting the same when receiving from said user terminal a service request indicative of the intention of conducting communication having the contracted communication quality,
said user terminal includes the step of conducting communication with said password contained in a packet header,
a communication period is notified to said access network manager terminal at the time of said service request made by said user terminal, and
said access network manager terminal determines whether there is a free resource during said communication period based on resource reservation conditions.

16. The admission control method as set forth in claim 15, wherein
communication is conducted with a communication period contained in said password from said user terminal to said edge router in which period communication is possible having said contracted communication quality.

17. The admission control method as set forth in claim 15, wherein
said edge router includes the steps of:
authenticating rightfulness of the password contained in said packet header, and
providing service of said contracted communication quality when determination is made by the authentication that the password is right.

18. The admission control method as set forth in claim 15, wherein
said access network manager terminal makes a charge based on a requested communication quality class, a communication period and a communication rate contained in a service request from said user terminal.

19. The admission control method as set forth in claim 15, wherein
said password information includes ciphering key information for ciphering a password,
said core network manager terminal notifies said edge router of cipher decoding key information for decoding a password,
said access network manager terminal ciphers said password to be notified to said user terminal, and
said edge router decodes said password contained in said packet header to conduct authentication.

20. The admission control method as set forth in claim 15, wherein
flow identification information is notified to said access network manager terminal at the time of said service request made by said user terminal,
said password from said access network manager terminal to said user terminal is notified with said flow identification information contained, and
service is provided by said edge router without password authentication of a packet coincident with said flow identification information during a period of validity of said password.

21. The admission control method as set forth in claim 15, wherein
flow identification information is notified to said access network manager terminal at the time of said service request made by said user terminal,
said password from said access network manager terminal to said user terminal is notified with said flow identification information and said communication rate contained, and
said edge router publishes a packet coincident with said flow identification information at said communication rate.

22. The admission control method as set forth in claim 15, wherein
at the time of notifying said user terminal of said password by said access network manager terminal, through which edge router a packet of a session which receives service should pass is notified.

* * * * *